United States Patent    (10) Patent No.: US 12,179,275 B2
Ihara    (45) Date of Patent: Dec. 31, 2024

(54) DRILLING MACHINE

(71) Applicant: SUGINO MACHINE LIMITED, Uozu (JP)

(72) Inventor: Minoru Ihara, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 584 days.

(21) Appl. No.: 17/506,941

(22) Filed: Oct. 21, 2021

(65) Prior Publication Data

US 2022/0126373 A1   Apr. 28, 2022

(30) Foreign Application Priority Data

Oct. 28, 2020 (JP) ................. 2020-180806

(51) Int. Cl.
B23B 3/24 (2006.01)
B23Q 3/08 (2006.01)
B23B 47/28 (2006.01)

(52) U.S. Cl.
CPC ............ B23B 3/24 (2013.01); B23Q 3/08 (2013.01); B23B 47/28 (2013.01)

(58) Field of Classification Search
CPC .. B23B 47/26; B23Q 5/04; B23Q 5/32; B23Q 5/326; B23Q 5/34; B23Q 5/38; B23Q 5/40; B23Q 11/001; B23Q 2701/01
See application file for complete search history.

(56) References Cited

U.S. PATENT DOCUMENTS 5,421,229 A * 6/1995 Grossmann .......... B23Q 39/048
    82/127
2001/0010783 A1   8/2001 Desmoulins

FOREIGN PATENT DOCUMENTS

| CN | 204486842 U | 7/2015 | |
| CN | 104907600 A * | 9/2015 | |
| CN | 104907600 B | 1/2017 | |
| DE | 1552361 A1 | 5/1970 | |
| DE | 19648251 A1 * | 5/1996 | ........... B23B 39/167 |
| DE | 10348568 A1 * | 5/2004 | ......... B23Q 11/0003 |
| JP | S55-005207 A | 1/1980 | |
| JP | H07-051974 A | 2/1995 | |

(Continued)

OTHER PUBLICATIONS

For.*

(Continued)

Primary Examiner — Alan Snyder
Assistant Examiner — Eric D Whitmire
(74) Attorney, Agent, or Firm — United IP Counselors, LLC

(57) ABSTRACT

The drilling machine includes a spindle, a spindle motor, a frame including, a linear motion guide support plate, a motor support portion, and a ram support plate disposed at a front end of the linear motion guide support plate, and having a height lower than the motor support portion, a linear motion guide disposed on the reference surface, a slider having a nut mounting hole to reciprocate along the linear motion guide, and having a height substantially the same as the motor support portion, a ram penetrating the first ram guide hole, a feed screw including a screw shaft having a rear end supported by the motor support portion and a front end that is a free end, and a nut fastened to the nut mounting hole; and a feed motor connected to the screw shaft.

9 Claims, 4 Drawing Sheets

(56) References Cited

FOREIGN PATENT DOCUMENTS

| | | |
|---|---|---|
| JP | 2001-087918 A | 4/2001 |
| JP | 3792451 B2 | 7/2006 |
| JP | 2019-181645 A | 10/2019 |
| JP | 2020-157400 A | 10/2020 |
| WO | WO-2016021213 A1 * | 2/2016 ............. B23B 13/12 |

OTHER PUBLICATIONS

Office Action mailed on Aug. 17, 2021 in a corresponding Japanese Patent Application No. 2020-180806 (7 pages).

Extended European Search Report mailed on Mar. 30, 2022 in a corresponding European Patent Application No. 21201856.8 (8 pages).

* cited by examiner

DRILLING MACHINE

CROSS-REFERENCE TO RELATED APPLICATIONS

This application claims the benefit of priority to Japanese Patent Application No. 2020-180806, filed on Oct. 28, 2020, the entire contents of which are hereby incorporated by reference.

BACKGROUND

1. Technical Field

The present invention relates to a drilling machine.

2. Description of the Background

An electric machining apparatus for machining a workpiece by a tool retractably moved and rotated by an electric motor is known in Japanese Patent No. 3792451. The conventional electric machining apparatus includes a hollow frame, a ram, a ball screw, a linear bearing, and a screw supporter. The ram is retractably held in a hole formed in the frame, and has at its distal end a spindle which rotates with a tool mounted thereon. The ball screw is rotatably supported in the frame parallel to the ram. The linear bearing includes a guide rail, and a slider. The guide rail is fixed in the frame parallel to the ram. The slider is movably supported on the guide rail. The screw supporter includes a fixed portion, a locking portion, and a nut portion. The fixed portion is retractably disposed in the frame, and is fixed to the slider. The locking portion locks the proximal end of the ram. The nut portion is screwed into the ball screw.

BRIEF SUMMARY

An object of the present invention is to provide a drilling machine which is easy to manufacture and has high feeding accuracy.

A first aspect of the present invention provides a drilling machine, including:
a spindle extending horizontally;
a spindle motor configured to drive the spindle;
a box-shaped frame having an opening upward, the frame including,
  a linear motion guide support plate having a reference surface manufactured by cutting,
  a motor support portion disposed at a rear end of the linear motion guide support plate, and
  a ram support plate having a first ram guide hole, the ram support plate disposed at a front end of the linear motion guide support plate, the ram support plate having a height lower than the motor support portion;
a linear motion guide disposed on the reference surface;
a slider having a nut mounting hole at an upper portion, the slider having a lower end connected to the linear motion guide configured to reciprocate along the linear motion guide, the slider having a height substantially the same as the motor support portion;
a ram penetrating the first ram guide hole to be fastened to a front surface of the slider;
a feed screw including
  a screw shaft having a rear end supported by the motor support portion and a front end that is a free end, the screw shaft disposed above the ram, and
  a nut fastened to the nut mounting hole; and
  a feed motor fixed to the motor support portion to be connected to the screw shaft.

A first fitting portion and a second fitting portion are, for example, cylindrical surfaces. For example, the first fitting portion is disposed so as to protrude from one end portion of the ram support plate. The second fitting portion is, for example, a bottomed hole located on the ram guide.

The ram connects to the center of the slider. The ram is supported in the second ram guide hole.

The screw shaft penetrates the motor support portion. The output shaft of the screw shaft and the feed motor may be connected coaxially via a coupling.

The spindle may have a hollow structure.

A spline shafts and a spline hole are arranged coaxially with the spindle. The spline shaft extends into the inside of the spindle. The spline shaft penetrates the motor support portion. The output shaft of the spline shaft and the spindle motor may be connected coaxially via a coupling.

The slider may have a nut mounting hole. The nut mounting hole may be disposed with sufficient clearance relative to the nuts.

The adjustment jig is attached to the frame when the nut is fastened to the slider. The adjustment jig is adjusted so that the screw shaft is parallel to the linear motion guide.

According to the present invention, it is possible to provide a drilling machine that is easy to manufacture and has high feeding accuracy.

DETAILED DESCRIPTION

Figure 1:
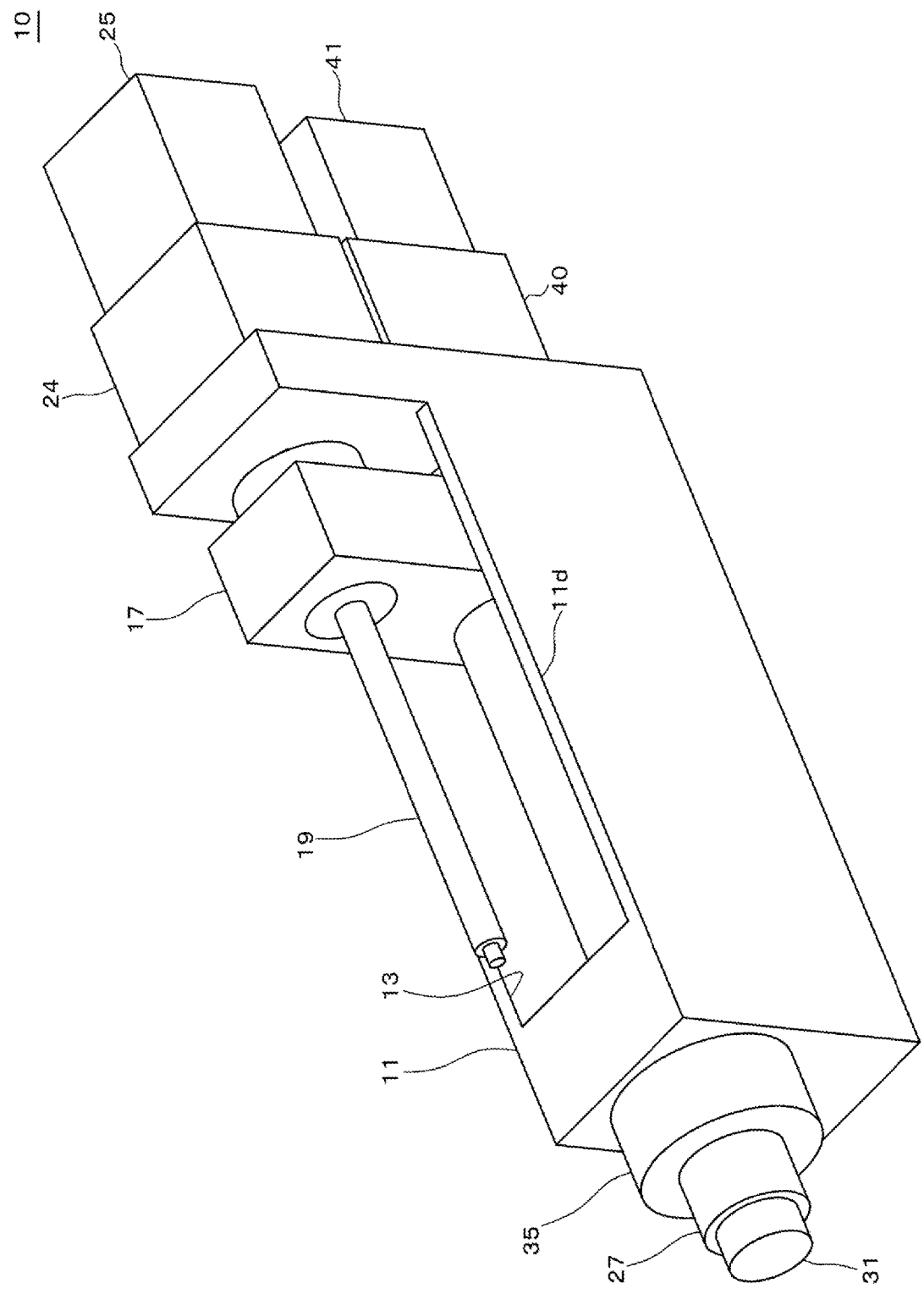
FIG. 1 is a perspective view of a drilling machine according to an embodiment.
Figure 2:
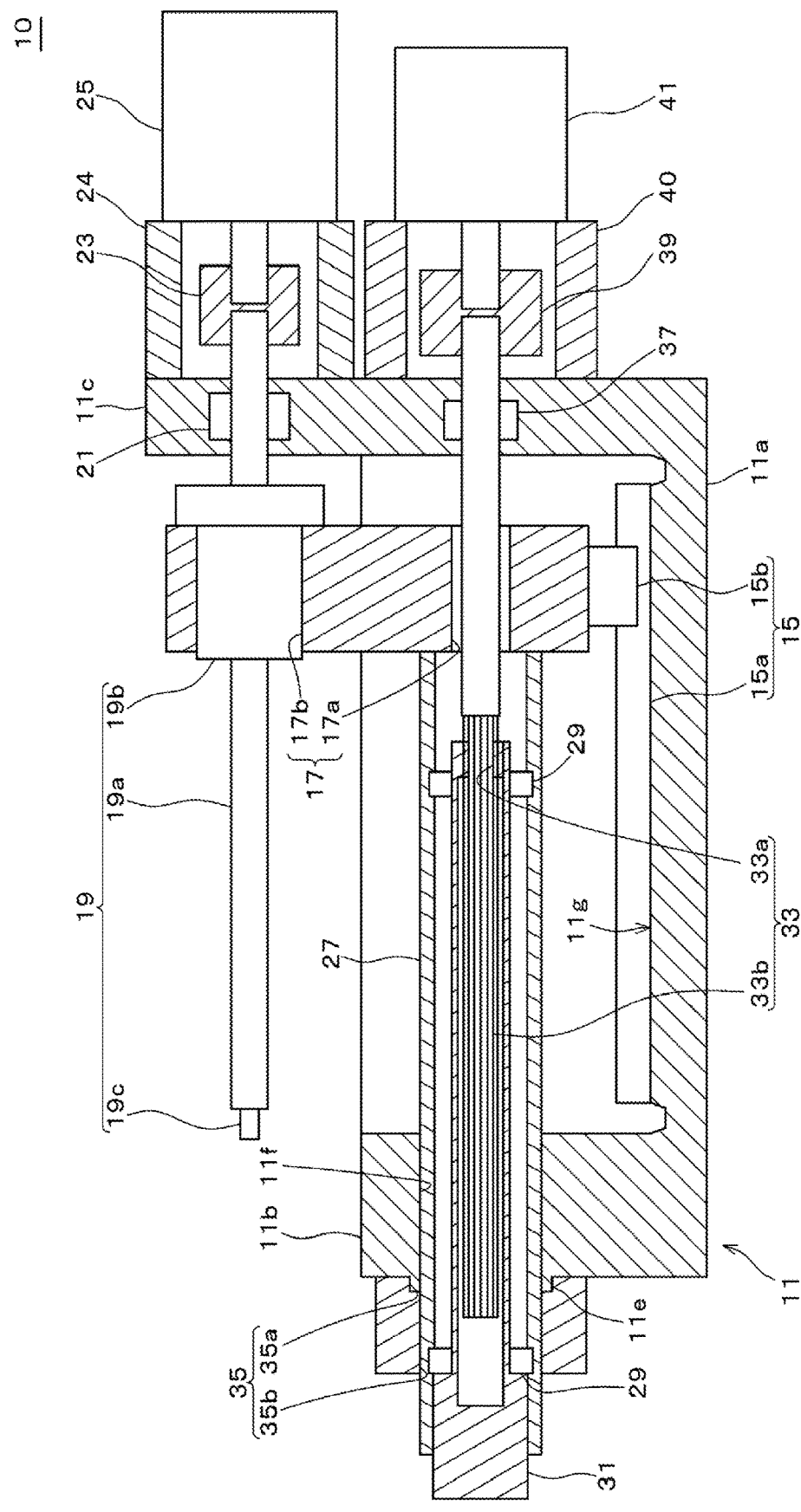
FIG. 2 is a longitudinal sectional view of the drilling machine according to the embodiment.

As shown in FIGS. 1 and 2, the drilling machine 10 includes a frame 11, a linear motion guide 15, a slider 17, a feed screw 19, a bearing 21, a coupling 23, a feed motor 25, a ram 27, a spindle bearing 29, a spindle 31, and a spindle motor 41.

Preferably, the drilling machine 10 includes a spline 33, a bearing 37, a ram guide 35, a coupling 39, a feed motor mounting base 24, a spindle motor mounting base 40, and an adjustment jig 45.

FIG. 2 is a cross-sectional view taken in a plane passing through the central axis of the spindle 31 and the feed screw 19.

The frame 11 includes a drive chamber 13. The frame 11 is box-shaped having an opening on the top. The frame 11 includes a linear motion guide support plate 11a, a ram support plate 11b, a motor support portion 11c, and a side plate 11d. For the sake of convenience, the opening of the drive chamber 13 is referred to as an upward direction, and the feed direction of the ram 27 is referred to as a forward direction.

The linear motion guide support plate 11a has a reference surface 11g on its upper surface.

The ram support plate 11b is disposed upright at one end (front end) of the linear motion guide support plate 11a. The ram support plate 11b includes a first fitting portion 11e and a first ram guide hole 11f. The first fitting portion 11e is coaxial with the first ram guide hole 11f. The first ram guide hole 11f, which is, for example, a cylindrical hole, penetrates the ram support plate 11b. The first fitting portion 11e, which is a cylindrical, is located on an outer surface of the frame 11.

The motor support portion 11c, which is a plate-shaped, is arranged upright at the other end (rear end) of the linear motion guide support plate 11a. The motor support portion 11c protrudes upward than the ram support plate 11b and the side plate 11d.

The side plate 11d connects the linear motion guide support plate 11a, the ram support plate 11b, and the motor support portion 11c.

The linear motion guide support plate 11a, the ram support plate 11b, the motor support portion 11c, and the side plate 11d may integrally form the frame 11.

The linear motion guide 15 is a so-called linear guide. The linear motion guide 15 includes a guide rail 15a, and a guide block 15b. The guide rail 15a is fixed on the reference surface 11g inside the drive chamber 13. The guide rail 15a extends in a front-rear direction. The guide block 15b reciprocates on the guide rail 15a.

The slider 17, which is rectangular, has a spline passage hole 17a, and a nut mounting hole 17b. The slider 17 is connected to the guide block 15b at a lower end (first end). The slider 17 has a substantially the same height as the motor support portion 11c.

The spline passage hole 17a, which is located at a lower portion of the slider 17, penetrates the slider 17 in the front-rear direction. The nut mounting hole 17b, which is located on an upper portion (second end side) of the slider 17, penetrates the slider 17 in the front-rear direction. The slider 17 moves together with the guide block 15b.

The ram 27 is inserted into the first ram guide hole 11f to be fastened to the center of the slider 17. The ram 27 is hollow such as cylindrical. The ram 27 is arranged parallel to the guide rail 15a. Preferably, the ram 27 slides with the first ram guide hole 11f.

The spindle 31 is supported by the ram 27 via the spindle bearing 29. A rotary tool (not shown) is disposed at a distal end of the spindle 31. The rotary tool is, for example, a drill or a tap. The spindle 31 has a hollow structure.

The spline 33 has a spline hole 33a, and a spline shaft 33b. The spline hole 33a is disposed at the rear end portion of the spindle 31 and coaxially with the spindle 31. The spline shaft 33b is supported by the motor support portion 11c via the bearing 37. The spline shaft 33b is inserted into the spline hole 33a. The spline shaft 33b extends into the inside of the spindle 31. The spline shaft 33b penetrates the motor support portion 11c to protrude rearward of the motor support portion 11c.

The spindle motor mounting base 40, which is, for example, a hollow prismatic, is detachably disposed on the motor support portion 11c. The length of the spindle motor mounting base 40, engagement with the spindle motor 41, the mounting shape of the mounting screw or the like may be appropriately designed in conformity with the mounting shape of the spindle motor 41.

The spindle motor 41 is fixed to the motor support portion 11c via the spindle motor mounting base 40. The spindle motor 41 is preferably a servo motor, or a PM synchronous motor. An output shaft of the spindle motor 41 is fastened to the spline shaft 33b by the coupling 39. Preferably, the spindle motor 41 is numerically controlled.

The spline 33, the spline passage hole 17a, the bearing 37, the coupling 39, and the spindle motor mounting base 40 may be eliminated, and the spindle motor 41 may be disposed inside the ram 27. In this case, the output shaft of the spindle motor 41 may be connected directly or via a coupling with the spindle 31. The output shaft of the spindle motor 41 may be integral with the spindle 31.

The feed screw 19 includes a screw shaft 19a, and a nut 19b. The feed screw 19 is preferably a ball screw. The feed screw 19 preferably has a cylindrical portion 19c. The nut 19b is fastened to the nut mounting hole 17b. The screw shaft 19a is disposed parallel to the guide rail 15a, and above the ram 27. One end (rear end) of the screw shaft 19a is supported by the motor support portion 11c via the bearing 21. The other end (front end) of the screw shaft 19a is a free end. The screw shaft 19a is cantilevered. The rear end of the screw shaft 19a penetrates the motor support portion 11c to protrude rearward of the motor support portion 11c. The nut 19b is smaller than the nut mounting hole 17b. A sufficient clearance may be provided between the nut 19b and the nut mounting hole 17b. The cylindrical portion 19c, which is coaxial with the screw shaft 19a, is disposed at a distal end of the screw shaft 19a.

The feed motor mounting base 24, which is, for example, a hollow prismatic, is detachably disposed on the motor support portion 11c. The length of the feed motor mounting base 24, engagement with the feed motor 25, the mounting shape of the mounting screw or the like may be appropriately designed in conformity with the mounting shape of the feed motor 25.

The feed motor 25 is fixed to the motor support portion 11c via the feed motor mounting base 24. The feed motor 25 is preferably a servo motor, or a PM synchronous motor. The output shaft of the feed motor 25 is fastened to the screw shaft 19a by the coupling 23. Preferably, the feed motor 25 is numerically controlled.

The ram guide 35 has a second fitting portion 35a, and a second ram guide hole 35b. The ram guide 35 is disposed on the front outer side of the ram support plate 11b. The second fitting portion 35a is a cylindrical hole, or preferably a clearance fit with the first fitting portion 11e. The second ram guide hole 35b penetrates the ram guide 35. Preferably, the second ram guide hole 35b slides with the ram 27.

Figure 3:
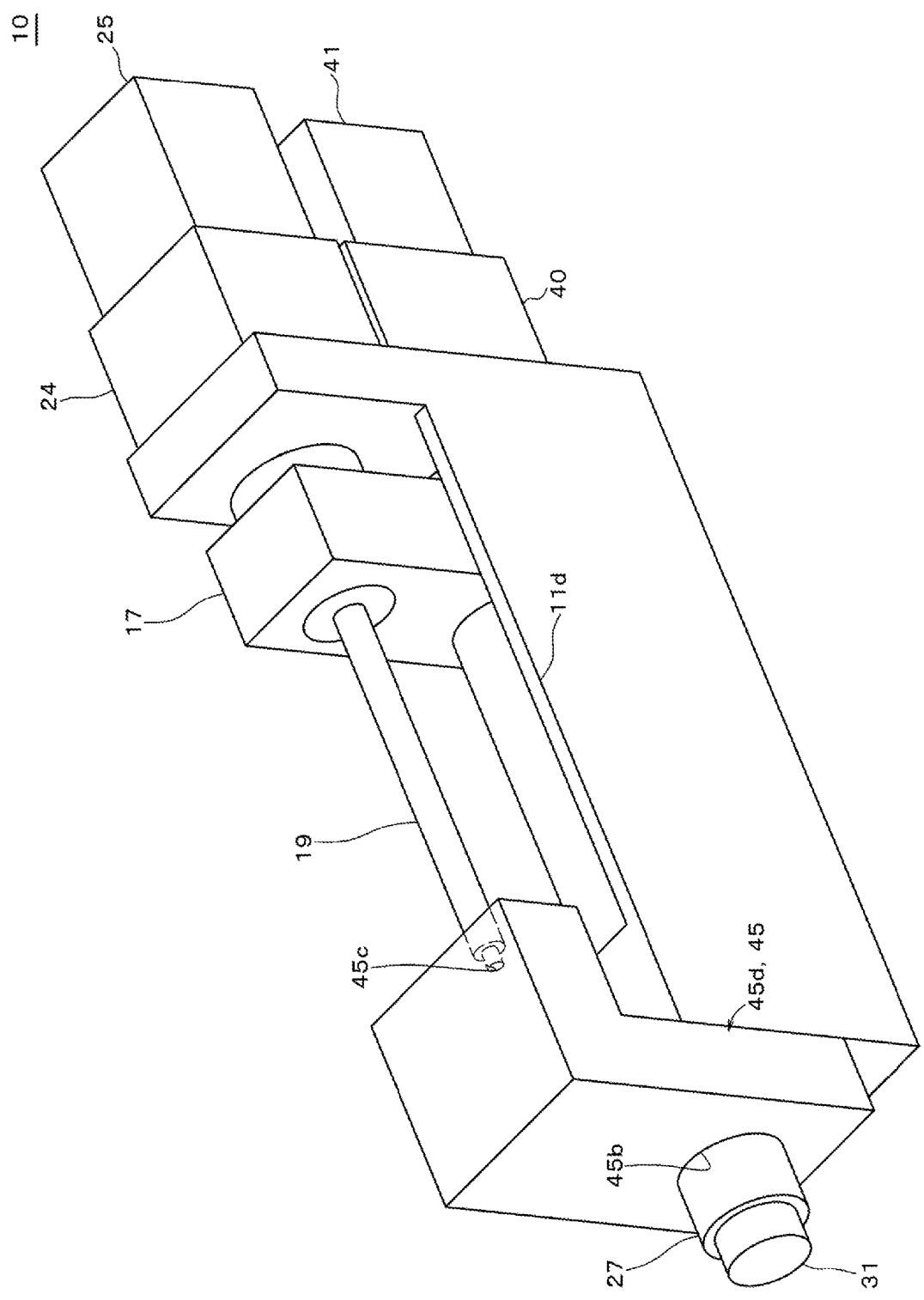
FIG. 3 is a perspective view showing an adjustment method of the drilling machine according to the embodiment.
Figure 4:
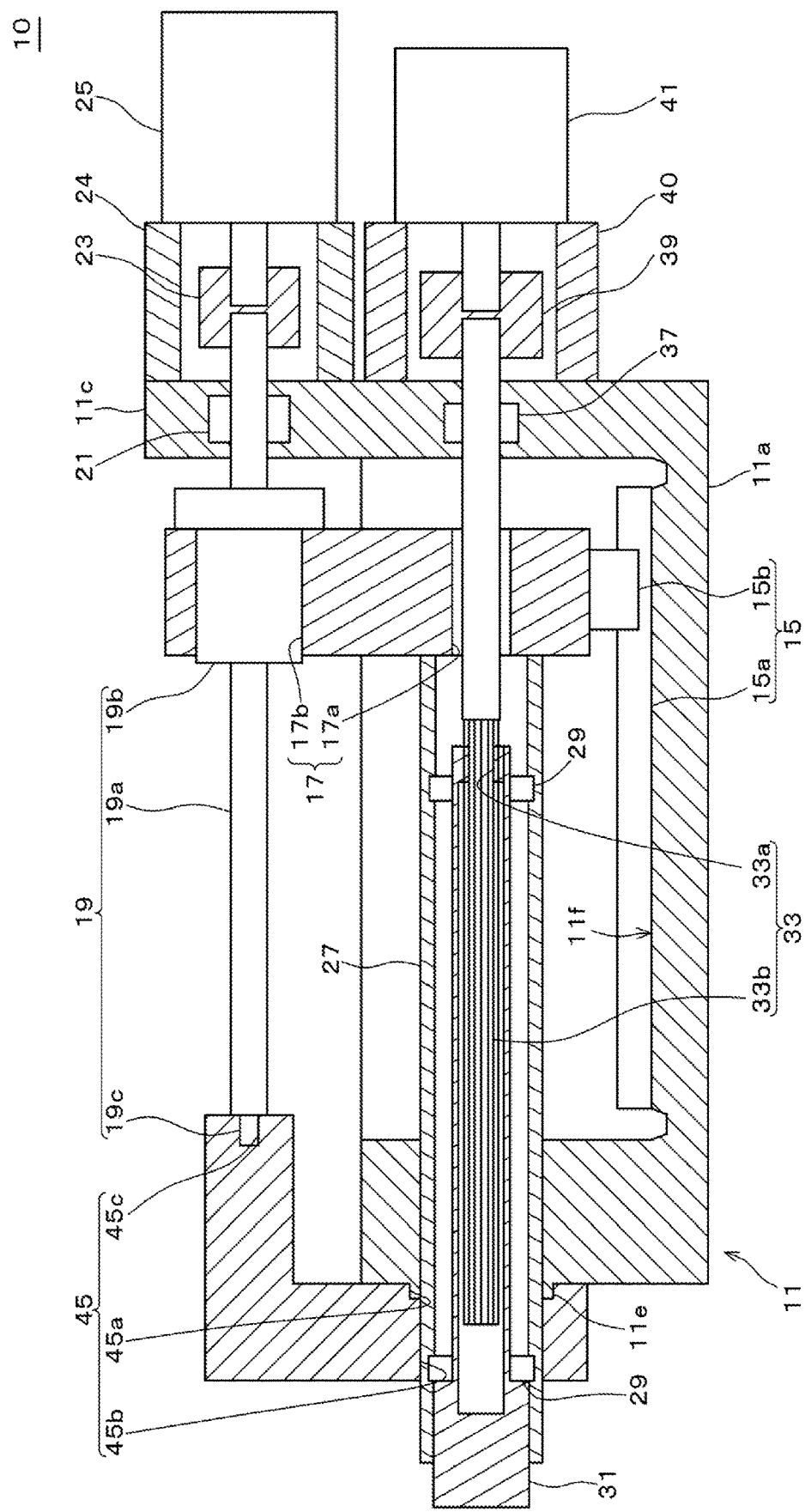
FIG. 4 is a longitudinal sectional view showing the adjustment method of the drilling machine according to the embodiment.

As shown in FIGS. 3 and 4, the adjustment jig 45 includes a third fitting portion 45a, a ram passage hole 45b, and a fourth fitting portion 14c. The adjustment jig 45 may have a reference surface 45d. The third fitting portion 45a, which is a cylindrical hole, fits with the first fitting portion 11e. The ram 27 passes through the ram passage hole 45b. Preferably, the ram passage hole 45b is larger than the ram 27 to the extent that the ram 27 can pass therethrough with sufficient clearance. The fourth fitting portion 14c, which is a cylindrical hole, fits with the cylindrical portion 19c. The reference surface 45d is parallel to a plane passing through the respective central axis of the third fitting portion 45a and the fourth fitting portion 14c. The adjustment jig 45 may be positioned on the frame 11 by pins.

When fastening the nut 19b to the nut mounting hole 17b, the adjustment jig 45 keeps the screw shaft 19a parallel to the guide rail 15a. With the ram guide 35 removed, the adjustment jig 45 is attached to the frame 11. The adjustment jig 45 is adjusted so that the reference surface 45d is positioned at the exact position. After fastening the nut 19b to the nut mounting hole 17b, the adjustment jig 45 is removed. The ram guide 35 is then attached to the frame 11.

Hereinafter, a method of using the drilling machine 10 will be described. The rotation of the spindle motor 41 is transmitted to the spindle 31 via the spline 33. When the feed motor 25 rotates, the slider 17 and the ram 27 is fed together via the feed screw 19. The rotary tool attached to the spindle 31 processes the workpiece.

The drilling machine 10 can also perform threading by making the feed and return to reverse rotation.

The distal end of the screw shaft 19a is a free end. Thus, the height of the ram support plate 11b can be lowered to the same level as the upper surface of the ram guide 35. The reference surface 11g is manufactured by cutting by putting a tool (e.g. end mill) from a direction perpendicular to the reference surface 11g. As the height of the ram support plate 11b is low, the cutting tool is less likely to interfere with the ram support plate 11b, which allows to cut the reference surface 11g easily. This is because the protruding amount of the tool is shortened when cutting the reference surface 11g. When the protruding amount of the tool is increased, the cutting tool such as an end mill is easily deflected by the cutting resistance to make it difficult to finish the reference surface 11g cleanly. In contrast, by reducing the protruding amount of the tool, the reference surface 11g may be speedy and easily cut with high accuracy.

When the distal end of the screw shaft 19a is a free end, the screw shaft 19a is likely to swing. However, the screw shaft 19a is supported with the nut 19b which is fastened to the upper end portion of the slider 17. The lower end of the slider 17 is supported by the linear motion guide 15. Thus, even if the distal end of the screw shaft 19a is a free end, the spindle 31 limitedly affects the feed accuracy.

The drilling machine 10 according to the embodiment with the above-mentioned structure can be easily manufactured and can maintain high feeding accuracy.

The feed motor 25 is installed on the detachable feed motor mounting base 24. Thus, it can be easily changed to a feed motor 25 having a different mounting shape.

The spindle motor 41 is disposed outside the frame 11. Thus, the spindle motor 41 can be easily changed. Furthermore, the spindle motor 41 is installed om the detachable spindle motor mounting base 40. Thus, it can be easily changed to a spindle motor 41 having a different mounting shape.

For example, when the spindle 31 is installed in the horizontal direction, the distal end of the ram 27 is inclined downward by the gravity acting on the ram 27 when the ram 27 is fed forward. Here, as the first fitting portion 11e and the second fitting portion 35a are clearance fit, the ram guide 35 can move by the amount of the clearance fit in the vertical and horizontal directions. Thus, the inclination of the ram 27 can be adjusted within the limit of the movement of the ram guide 35.

The slider 17 is supported by the linear motion guide 15. The ram 27 is supported at three points, that is, by the slider 17, the first ram guide hole 11f, and the second ram guide hole 35b. As the ram 27 is supported at three points, the ram 27 is not easily deflected.

The cylindrical portion 19c is disposed on the screw shaft 19a. Thus, by utilizing the adjustment jig 45, the screw shaft 19a can be easily adjusted parallel to the guide rail 15a.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

11 Frame
15 Linear motion guides
17 Slider
19 Feed screw
25 Feed motor
27 Ram
31 Spindle
33a Spline hole
33b Spline shaft
41 Spindle motor

What is claimed is:

1. A drilling machine, comprising:
a spindle extending horizontally;
a spindle motor configured to drive the spindle;
a box-shaped frame having an opening upward, the frame including
　a linear motion guide support plate having a reference surface manufactured by cutting,
　a motor support portion disposed at a rear end of the linear motion guide support plate, and
　a ram support plate having a first ram guide hole, the ram support plate disposed at a front end of the linear motion guide support plate, the ram support plate having a height lower than the motor support portion;
a linear motion guide disposed on the reference surface;
a slider having a nut mounting hole at an upper portion, the slider having a lower end connected to the linear motion guide configured to reciprocate along the linear motion guide, the slider having the same height as the motor support portion;
a ram penetrating the first ram guide hole to be fastened to a front surface of the slider;
a feed screw including
　a screw shaft having a rear end supported by the motor support portion and a front end that is a free end, the screw shaft disposed above the ram, and
　a nut fastened to the nut mounting hole;
a feed motor fixed to the motor support portion to be connected to the screw shaft;
a first fitting portion disposed on the ram support plate coaxially with the first ram guide hole; and
a ram guide detachably attached at a front outer side of the ram support plate, the ram guide including a second fitting portion configured to fit with the first fitting portion and a second ram guide hole within which the ram slides,
wherein the ram slides within the first ram guide hole and the second ram guide hole,
the feed screw includes a cylindrical portion disposed at a front end of the screw shaft and coaxially with the screw shaft, the cylindrical portion being configured to adjust a parallelism between the linear motion guide and the screw shaft, and
the drilling machine further comprises
　a first fitting portion disposed on the ram support plate coaxially with the first ram guide hole, and
　an adjustment jig, the adjustment jig including a third fitting portion configured to fit with the first fitting portion and a fourth fitting portion configured to fit with the cylindrical portion.

2. The drilling machine according to claim 1, wherein
the second fitting portion is clearance fit with the first fitting portion, and
a tilt of the ram is adjusted with clearance between the first fitting portion and the second fitting portion.

3. The drilling machine according to claim 2, further comprising:
a feed motor mounting base detachably disposed on the motor support plate,
wherein the feed motor is fixed to the feed motor mounting base.

4. The drilling machine according to claim 1, further comprising:
a feed motor mounting base detachably disposed on the motor support plate,
wherein the feed motor is fixed to the feed motor mounting base.

5. The drilling machine according to claim 1, further comprising:
a spline shaft supported by the motor support portion;
wherein the spindle has a spline hole located inside the spindle to mesh with the spline shaft,
the spindle motor is disposed on the motor support portion to be connected to the spline shaft, and
the slider has a spline passage hole into which the spline shaft penetrates.

6. The drilling machine according to claim 5, further comprising:
a spindle motor mounting base detachably disposed on the motor support portion,
wherein the spindle motor is fixed to the spindle motor mounting base.

7. The drilling machine according to claim 1, wherein
the feed screw includes a cylindrical portion disposed at a front end of the screw shaft and coaxially with the screw shaft, the cylindrical portion configured to adjust a parallelism between the linear motion guide and the screw shaft.

8. The drilling machine according to claim 1, wherein the ram is supported in the second ram guide hole.

9. The drilling machine according to claim 1, further comprising:
a feed motor mounting base detachably disposed on the motor support plate,
wherein the feed motor is fixed to the feed motor mounting base.

* * * * *